March 16, 1954 — R. C. ZEIDLER — 2,672,226
CENTRIFUGAL CLUTCH

Filed Oct. 23, 1948 — 3 Sheets-Sheet 1

Inventor:
Reinhold C. Zeidler
By: Edward C. Fritzlang
Atty.

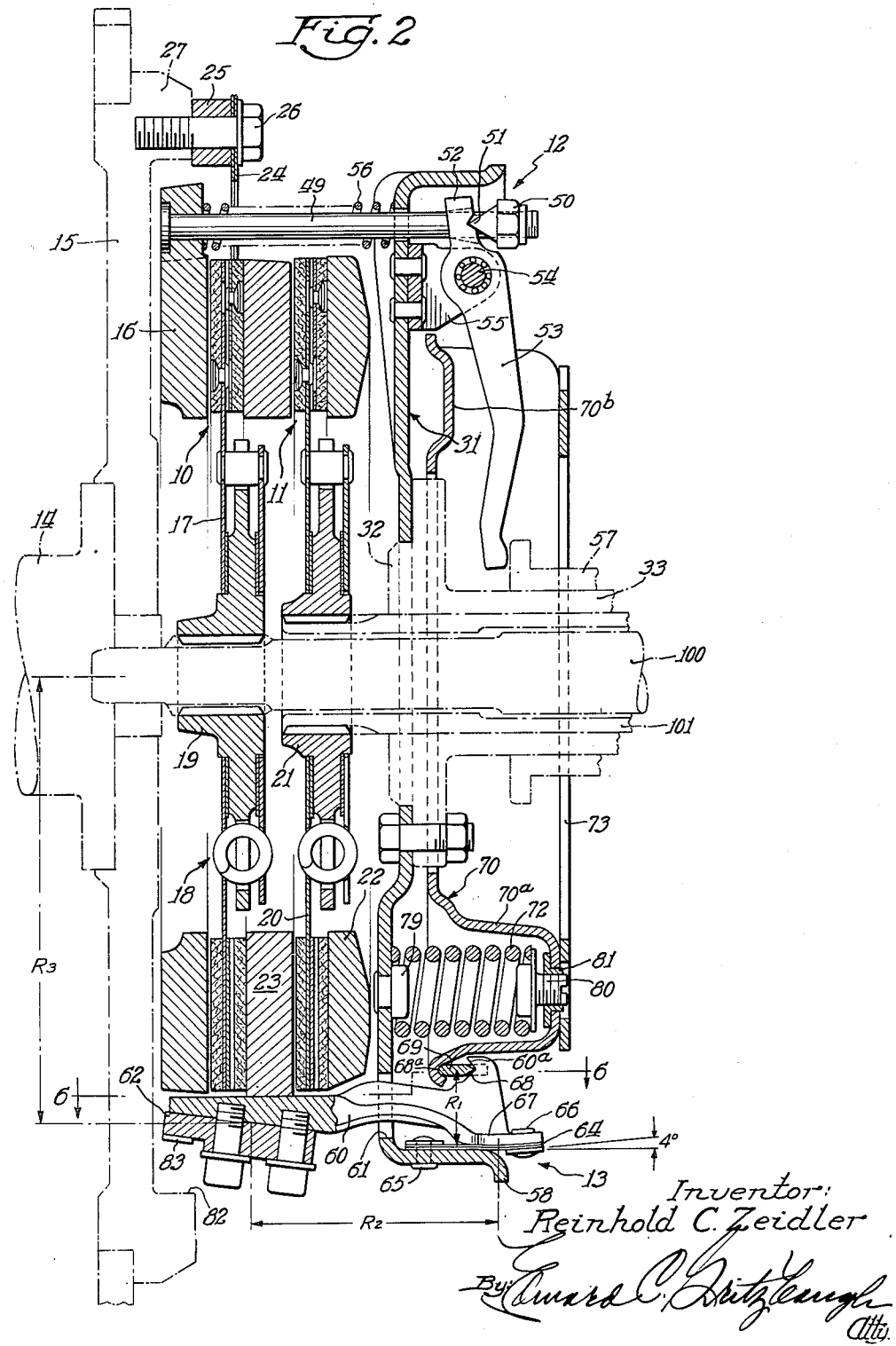

March 16, 1954   R. C. ZEIDLER   2,672,226
CENTRIFUGAL CLUTCH
Filed Oct. 23, 1948   3 Sheets-Sheet 3
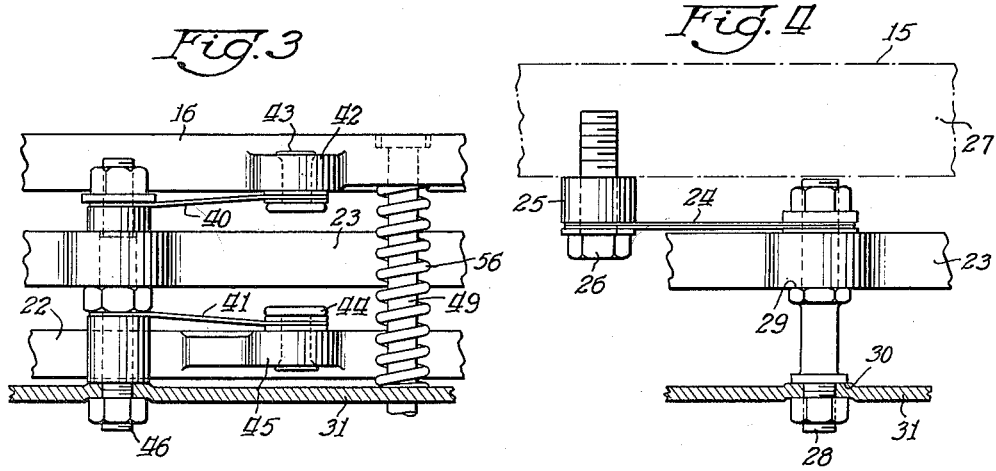
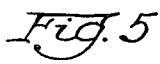
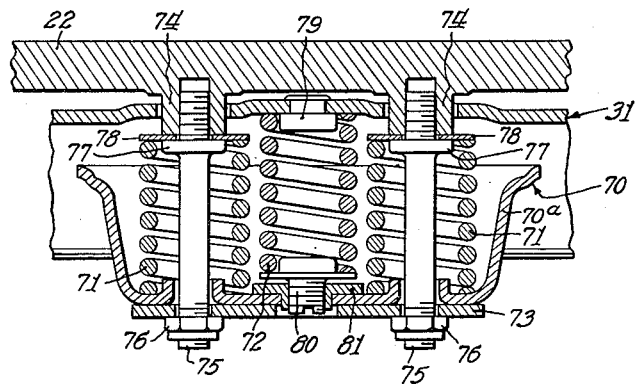
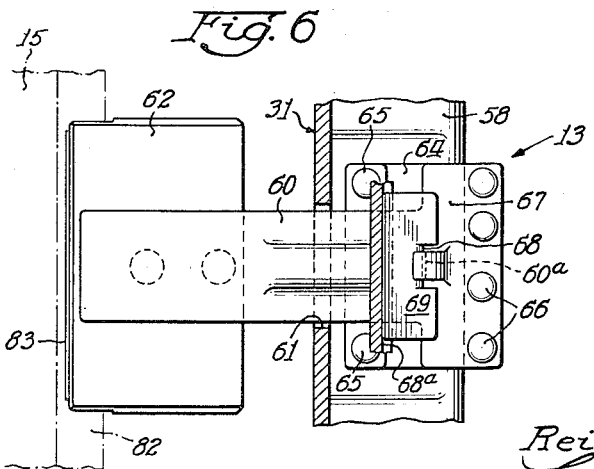
Inventor:
Reinhold C. Zeidler
By Edward C. Fritzlanger
Atty.

Patented Mar. 16, 1954

2,672,226

UNITED STATES PATENT OFFICE 2,672,226

CENTRIFUGAL CLUTCH

Reinhold C. Zeidler, Detroit, Mich., assignor to Borg-Warner Corporation, Chicago, Ill., a corporation of Illinois Application October 23, 1948, Serial No. 56,075

19 Claims. (Cl. 192—105)

This invention relates to clutches and more particularly to automatically operating clutches of the centrifugally energized type, wherein the clutch is normally automatically engaged and disengaged as the speed of the driving member of the clutch is increased or decreased through a predetermined operating range. While the chosen embodiment of this invention has been designed to meet the specific operating requirements of automotive clutches, it will be understood that the clutch of my invention can be employed in a wide variety of power-transmitting devices.

It is the primary object of this invention to provide an improved automatic clutch of the centrifugally energized type adapted to smoothly establish a driving connection between driving and driven members in response to variations in the speed of one of the members.

Another object of the invention is to provide a clutch of the type described wherein the operating parts of the centrifugally actuated mechanism function with a minimum of friction insuring the consistent and smooth operation of the mechanism over a long period of time, usually the life of the automotive vehicle.

A further object of the invention is to provide an automatic clutch, wherein centrifugal force responsive mechanism is operative to effect frictional engagement between driving and driven clutch plates upon a predetermined speed of rotation of the driving clutch plate, the mechanism including springs which are slowly compressed to transfer pressure gradually to one of the clutch plates for obtaining engagement of the clutch plates with progressively increasing force to smoothly pick up the load connected to the driven plate without shock.

A further object of the invention is the provision of an automatic clutch of the type described having clutch-engaging and disengaging mechanism including a set of normally inoperative springs compressible for urging the driving clutch plate into engagement with the driven clutch plate, a second set of springs normally active to effect disengagement of the plates, a spring housing connecting both sets of springs, and centrifugally responsive elements operative, at a predetermined speed of the driving plate, to exert pressure on the housing to compress both sets of springs to effect engagement of the plate by the set of compressible springs and to render the clutch-release springs inoperative.

Still another object of the invention is the provision, in a clutch as described above, of centrifugally responsive mechanism including a plurality of weighted levers secured to flexible straps connected to and rotatable with a driving member and providing fulcrums for the levers, the levers being operative to exert force on a knife-edge of a strut pivoted on the spring housing, this structure being particularly designed for the purpose of minimizing friction between these operating parts of the clutch engaging and disengaging mechanism.

A further object of the invention is to provide a clutch mechanism including a novel arrangement of clutch-engaging springs, clutch-releasing springs, and housing and reaction members therefor, together with adjustment means for maintaining a desired relation therebetween.

The present invention also contemplates the combination of a double clutch assembly, in which one of the clutches is engaged and disengaged by centrifugal force responsive mechanism and the other clutch may be engaged by power means of manually operated means.

Other objects, advantages and use of the invention will become more apparent after reading the following specification and claims and after consideration of the drawings forming a part of the specification, wherein:

Fig. 2 is a longitudinal sectional view of the clutch mechanism shown in Fig. 1 and is taken on the line 2—2 of Fig. 1.

Fig. 3 is a sectional view taken substantially on line 3—3 of Fig. 1.

Fig. 4 is a sectional view taken substantially on line 4—4 of Fig. 1.

Fig. 5 is a sectional view taken substantially on line 5—5 of Fig. 1.

Fig. 6 is a view taken along the line 6—6 of Fig. 2.

Figure 1:
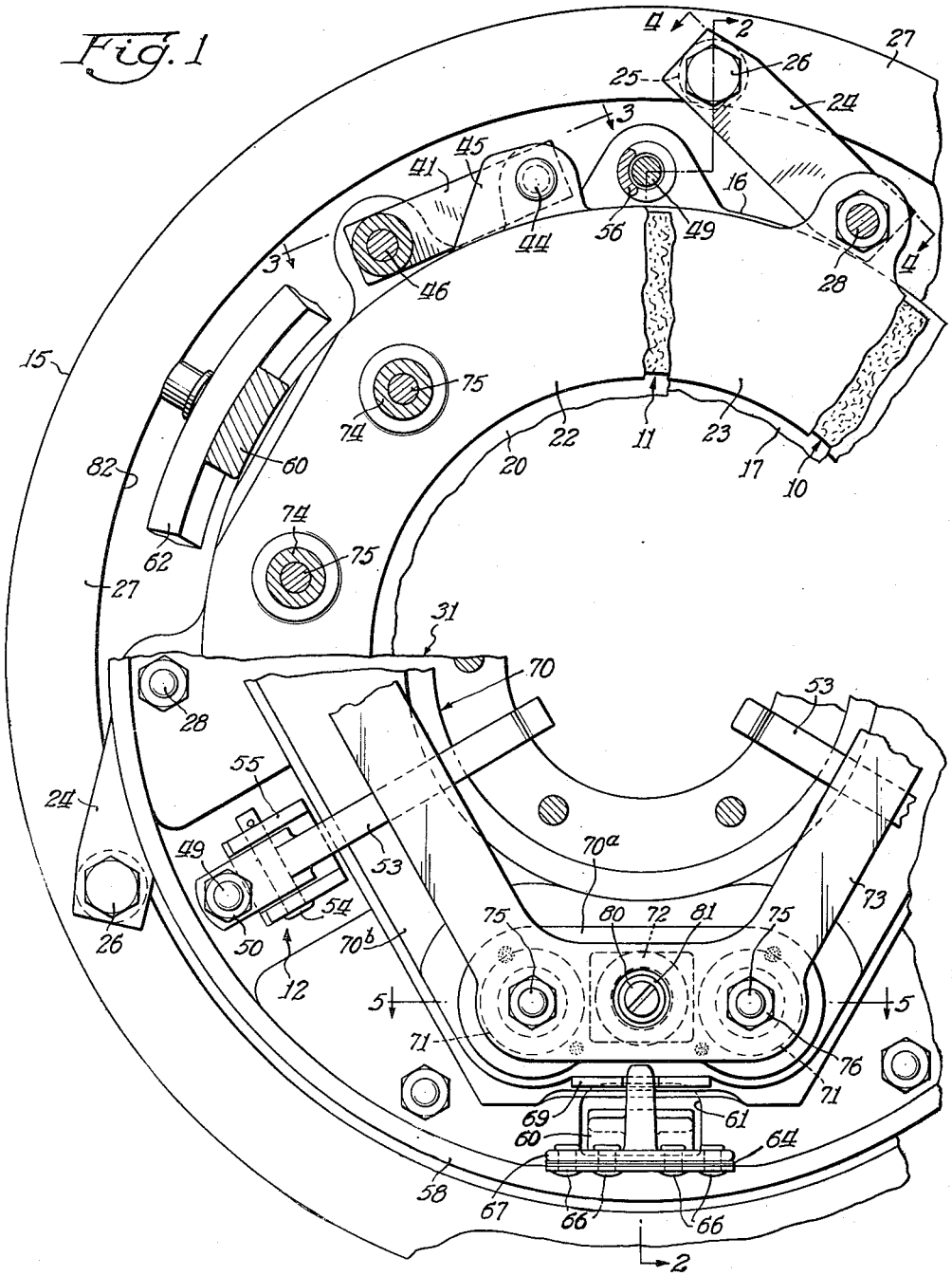
Fig. 1 is a rear view of the clutch embodying the features of this invention, with certain parts removed and certain other parts broken away in order to more clearly illustrate the structure involved.

The clutch chosen to illustrate an embodiment of this invention is of a type intended for automotive installation and may be referred to as a double clutch assembly comprising a clutch 10 and a clutch 11, the clutch 10 being normally disengaged and adapted to be engaged by lever mechanisms, one of which is indicated at 12 and which may be manually or power operated, and the clutch 11 being normally disengaged and adapted to be engaged by centrifugal force responsive mechanisms, one of which is indicated at 13. A double clutch arrangement of this type can be adapted for use with a transmission (not shown) for the purpose of automatically instituting a change in speed ratio by engagement or disengagement of a clutch, such as the clutch 11, by means of centrifugally responsive mechanism, such as indicated at 13, or a change in speed ratio by engagement or disengagement of a clutch, such as the clutch 10, by power operated means or manually operated means, such as indicated at 12, under the control of the operator of the vehicle. As will become apparent from the following description of the structure shown in the drawings, the two clutches are independently controllable and, therefore, the clutch 10, with its manually operated or power operated lever arrangements 12, and the clutch 11, with its speed responsive mechanisms 13, while herein considered collectively, may also be considered as distinct entities and treated as separate and independent individual units, inasmuch as each clutch can be used separate from the other and the operation of one clutch is not independent upon the operation of the other clutch. The clutch lever mechanisms 12 and clutch speed-responsive mechanisms are alternately arranged with respect to each other in annular array at the rear of the clutch as shown in Fig. 1.

The rear end of an engine crank shaft is indicated by the numeral 14 in Fig. 2 and carries a flywheel 15 connected to the driving members of the clutches 10 and 11 in a manner now to be described. The clutch 10 comprises an annular pressure plate 16, and a driven friction plate 17. The plate 17 is provided with the usual friction facing material on both sides and may have a resilient mounting 18 on its hub 19 to soften engagement shocks, as well as to prevent the transmission of torsional vibrations to the transmission of the vehicle. The internally splined hub 19 of the clutch plate 17 is adapted to be slidably mounted on the external splines of a shaft 100 connected to the vehicle transmission (not shown). The clutch 11 comprises a driven clutch plate 20, similar to the clutch plate 17, but the splined hub 21 thereof has a larger internal diameter than the clutch plate 17 for receiving a tubular or sleeve shaft 101. The driven clutch plate 20 is positioned adjacent an annular pressure plate 22. An annular plate 23 is disposed intermediate the driven clutch plates 17 and 20 and is connected to the flywheel 15, the plate 17 being adapted to be clamped between the pressure plate 16 and the intermediate plate 23 for drivingly connecting the flywheel 15 to the driven clutch plate 17 and the shaft 100, and the clutch plate 20 can be clamped between the intermediate plate 23 and the pressure plate 22 to transmit torque from the flywheel to the driven shaft 101.

A plurality of flexible driving connections between the flywheel 15 and the intermediate plate 23 are equi-distantly spaced circumferentially of the flywheel, each connection comprising straps 24 (Fig. 4) having one of their engaging opposite ends provided with apertures aligned with an aperture in a spacing washer 25, these apertures of the straps and washer receiving a bolt 26 threaded into an annular flange 27 on the flywheel, the other ends of the straps being secured to one of the circumferentially spaced peripheral lugs on the intermediate plate 23 by a stud 28. Each of the studs 28 have a shoulder 29 engaging the adjacent side of the intermediate plate 23 and a shoulder 30 engaging one side of a main cover plate to maintain the cover plate in spaced relation to the intermediate plate 23 for reception of the pressure plate 22 and driven plate 20 of the clutch 11 between the cover plate and intermediate plate. The extremities of the studs 28 are threaded for receiving nuts securing the straps 24 to the intermediate plate 23 and the studs 28 to the cover plate 31. The straps 24 are thus instrumental in providing driving connections between the flywheel 15 and the intermediate plate 23 and, in addition, will center the intermediate plate 23 with respect to the clutch assembly as well as to center the complete clutch assembly, as will become apparent as the description progresses. The main cover or mounting plate 31 is a ring-like stamping through which extends hub 32 provided by a flange of a sleeve 33 rotatably mounting the driven shaft 101, the hub 32 being connected to the plate 31 by means of nut and bolt assemblies.

As shown in Figs. 1 and 3, the pressure plates 16 and 22 are drivingly connected to the intermediate plate 23 by means of a plurality of circumferentially spaced connections, each connection comprising straps 40 and 41. The pressure plates 16 and 22 are connected to the intermediate plate 23 by means of straps 40 and 41, the strap 40 being connected at one end to a lug 42 integral with the pressure plate 16 by a rivet 43, the strap 41 being connected at one end thereof to the pressure plate 23 by means of a rivet 44 extending through the strap and lug 45 integral with the pressure plate 22, and the connection of the straps 40 and 41 to the intermediate plate 23 is accomplished by means of a stud 46 extending through the straps, the intermediate plate 23 and the cover plate 31. The stud 46 is provided with nuts threaded on opposite ends thereof and carries intermediate the ends thereof suitable spacing washers as shown in Fig. 3 to maintain the straps and thereby pressure plates 16 and 22 in spaced relation to the intermediate plate 23, as well as the cover plate 31, as shown in Figs. 2 and 3 in the released position of the clutch. The straps 40 and 41 are not only instrumental in connecting the pressure plates 16 and 22 to the intermediate plate 23 to transmit drive from the intermediate plate 23 to the two pressure plates 16 and 22, but also the straps act to center the pressure plates with respect to the intermediate plate and, in addition, permit the pressure plates 16 and 22 to be moved toward the intermediate plate 23 to clamp the driven clutch plates 17 and 20, respectively, between the pressure plates and the intermediate plate to selectively transmit drives to either the driven shaft 100 or the driven shaft 101. The straps 24 are effective to substantially prevent movement of the intermediate plate 23 axially of the clutch assembly and, as the cover plate 31 is rigidly connected to the plate 23, the plate 31 is also restrained against movement axially of the clutch. Thus, it will be apparent the plates 23 and 31 may be said to be fixed against movement axially of the clutch. It will thus be apparent from the foregoing description that, upon rotation of the flywheel 15, the intermediate plate 23 as well as the pressure plates 16 and 22 and the cover plate stamping 31 will be rotated in unison.

Referring now to the clutch 10, the driven clutch plate 17 will be drivingly connected to the flywheel upon actuation of the pressure plate 16 toward the intermediate plate 23 by means of the clutch-engaging and releasing mechanisms 12 shown in Figs. 1, 2 and 3. Each mechanism comprises a pull bolt 49 extending through a peripheral lug on the pressure plate 16 and through the cover plate 31 as shown in Figs. 2 and 3, the head of the bolt 49 being received within a recess in the pressure plate 16 and having its threaded end provided with a nut 50 having spaced aligned tapered portions presenting a knife-edge 51 received within spaced recesses at the outer extremity 52 of a lever 53. The extremity 52 of the lever is provided with an opening for receiving the bolt 49 and the lever 53 is fulcrumed at 54 by means of needle bearings carried by a U-shaped bracket 55 fixed to the cover plate stamping 31 by means of rivets as shown in Fig. 2. The bolt 49 has a spring 56 surrounding it, with the opposite ends of the spring abutting against the pressure plate 16 and the cover plate stamping 31 and effective to force the pressure plate 16 away from the driven friction plate 17 to normally maintain the clutch 10 disengaged. It will be apparent that pressure may be applied to the radially inner extremity of the levers 53 by the collar 57 slidably mounted on the sleeve 33, and the pressure will be transmitted to the knife-edges 51 of the nuts 50 to move the bolts 49 toward the right against the pressure of the springs 56 to thereby move the pressure plate 16 toward the intermediate plate 23 to clamp the driven clutch plate 17 between the pressure plate 16 and the intermediate plate 23 for establishing a driving connection between the flywheel 15 and the driven shaft 100. Upon the release of pressure from the levers 53, the springs 56 will act to move the pressure plate 16 toward the left to effect disengagement of the pressure and intermediate plates 16 and 23 with the driven clutch plate 17.

Referring now to the clutch 11 and the three circumferentially spaced centrifugally responsive actuating mechanisms 13 therefor (Figs. 1, 2, 5 and 6), it may be noted that the main cover stamping 31 has a peripheral flange 58 extending toward the transmission instead of toward the clutch. Each mechanism 13 comprises a lever 60 extending through an adjacent opening 61 in the stamping 31, with the one end of the lever being provided with a weight 62 secured to the lever by bolts as shown in Fig. 2. The other extremity of the lever is secured to the axially extending flange 58 of the main cover stamping or support by means of two straps 64. These straps are rectangular pieces of tempered spring steel. Each of the opposite ends of the straps are provided with aligned openings, the openings at one end of the straps receiving rivets 65 for securing the straps to the flange 58 of the plate 31, and the openings at the other end of the straps receiving rivets 66 extending through openings in a transverse flat web or fulcrum portion 67 on the end of the lever 60 remote from the end having the centrifugal weights 62 attached thereto. The lever 60 is provided with a recess 60a engaging the knife-edge 68 of a strut 69, the other and opposite edge of the strut being received within a recess 68a provided by an arcuately bent edge portion of a spring housing 70.

The spring housing 70 is triangular in shape (see Fig. 1) and is formed with deep pockets 70a, each housing two pressure springs 71 and one release spring 72, as shown in Figs. 1 and 5. It may be noted that spring-housing pocket portions 70a of the spring housing are connected by flat base portions 70b adjacent the stamping 31 to provide clearance for the clutch levers 53 disposed between the spring pockets 70a. A flat plate 73, triangular in shape, engages the outer portions of the spring pocket portions 70a of the housing 70 and is spotwelded thereto to serve as a reinforcement and to reduce deflection. The clutch levers 53 also extend between the flat surfaces of the spring housing and the reinforcement plate 73 and may be operated without interference from the housing and plate. The spring housing 70 and the cover plate 73 are maintained in floating relation to the cover stamping 31 to permit movement of the spring housing and reinforcement plate axially of the driven shaft. For this purpose and referring to Fig. 5, the pressure plate 22 is provided with bosses 74 extending through openings in the cover 31 to support and pilot resilient thrust means in the form of the pressure springs 72, the bosses having the ends of studs 75 threaded therein, the studs 75 extending through the springs 71 and openings in the outer wall of the spring pockets and through the reinforcement plate 73 for receiving nuts 76. Positioned against a shoulder 77 on each stud 75 is a washer 78 engaging one end of the adjacent spring 71, the other end of the spring 71 being engaged with the outer wall of the spring pocket. The springs 71 are pressure springs or resilient thrust means that supply their load to the pressure plate 22 by means of the washers 78 and bosses 74 of the pressure plate 22. Referring to Fig. 5, the two springs 71 have positioned therebetween the springs 72 having one end thereof positioned against the main cover stamping 31 with a positioning boss 79, riveted to the stamping 31, being received within said end of the spring, the other end of the spring 72 being engageable with a spring-seat member 80 threaded into a washer 81 engaging the spring housing 70. The springs 72 in the spring pockets 70a thus react against the cover stamping 31 to urge the spring housing 70 and the reinforcement plate 73 axially away from the cover stamping 31 to thereby cause the studs 75, connecting the pressure plate and the reinforcement plate, to move the pressure plate 22 away from the driven clutch plate, these springs 72 thus serving to maintain the clutch 11 in released position. The release movement of the spring housing 70 is limited by its connection through struts 69 to levers 60 which in turn have a positive stop against the periphery of plate 23. It may be noted that the design of the spring housing 70 is such that the release and pressure springs 72 and 71, respectively, in each spring pocket are grouped together close to the centrifugal lever they are to influence.

In order to provide for the proper initial release clearance of the clutch 11, the springs 71 may be compressed to obtain the desired clearance between the pressure plate 22 and the driven plate 20 by tightening the nuts 76, which are of the self-locking type. In the event of wear of the friction facings of driven plate 20, the nuts 76 can be unscrewed, increasing the length of springs 71 and moving the pressure plate 22 toward plate 23 to provide again the desired clearance. This can be done without altering the operation of the springs 72 from effecting release of the clutch, as the springs 72 react against the main cover stamping 31 to urge the spring housing 70 and the plate 73 rearwardly, as viewed in Figs. 2 and 5, whereby the nuts 76 and studs 75 will cause the pressure plate to be withdrawn from the friction facings of the driven friction plate 20. An initial clearance of .410" between plates 22 and 23 gives sufficient clearance over driven plate 20 and is made when the clutch is at rest with the centrifugal lever abutting the periphery of the intermediate plate 23.

The release springs 72 also have a self-locking adjusting arrangement provided by the seating members 80, each having a screw-threaded connection to the washer 81 engaging the spring housing 70, whereby the spring-seat members 80 may be rotated to release or exert pressure on the springs 72. The springs 72 are of an approximate predetermined load so that the spring-seat members or adjusting screws 80 may be finally adjusted to insure that the weights 62 will start to throw out at the desired speed of rotation of the flywheel 15 and all at the same time.

It may be noted that the spring housing moves axially with little or no friction, since it is not positively centered and, therefore, has no rubbing contact with other parts. This is accomplished by the springs 72 being piloted at both ends which are ground substantially square and since the springs are quite inflexible, except axially thereof, the springs tend to maintain the housing 70 concentric with the cover 31. Of further assistance in this respect are the struts 69, which being always under load also tend to center the housing and prevent it from rattling.

Considering now the operation of the centrifugally responsive clutch actuating mechanism 13, when the clutch is not rotating, or is rotating very slowly during engine idling, the levers 60 engage the outer circumferential edge of the intermediate plate 23 and the clutch release springs 72 are effective to maintain the pressure plate 22 spaced from the friction driven plate 20, as previously described. More rapid rotation of the clutch causes centrifugal forces to act on the weights 62 to swing the levers 60 about and radially of the clutch axis (the straps serving as fulcrums for the levers), causing the spring housing 70 to move toward the main cover stamping 31 due to the connection of the levers 60 and struts 69 to the spring housing. This movement of the spring housing causes the release springs 72 to start compressing and the pressure plate to be brought into contact with the friction facings of the driven friction plate 20. As the speed of rotation increases, the weights will continue to move outwardly of the clutch assembly to cause the friction facings of the driven plate 20 to be clamped between the intermediate plate 23 and the pressure plate 22, the pressure springs 71 being continually compressed during the increased extent of movement of the weights 62 toward a shoulder 82 formed on the inner clutch-mounting and driving portion of the flywheel 15. At this time, the pressure springs 71 have compressed approximately .050", which allows .050" wear of the friction facings of the clutch plate 20 before an adjustment for clearance by the nuts 76 is required, which, in the course of normal operation, would be very infrequent, if ever. Friction pads 83 of a cushioning material are cemented to the weights 61 and engage the shoulder 82 of the flywheel when the levers 60 have been moved by the weights 62 toward the shoulder 82 on the flywheel 15, the shoulder 82 thus providing a limit stop and the friction pad 83 preventing any noise when the weights strike or come in contact with the shoulder 82 of the flywheel. The radius in the weight 62, at this point, and likewise in the pad 83 attached to the weight 62, is slightly greater than the radius at the shoulder in the flywheel 15, and this causes the pad to make contact at its outer ends and gives much greater friction damping and stability to the weight and lever arm assembly to prevent it from vibrating or rattling under the influence of torsional vibration of power impulses from the engine.

In any centrifugal force-responsive clutch, it is of paramount importance to reduce friction of the operating parts to a minimum in order to insure consistent and smooth operation over an extended period of time, usually the life of the vehicle. In this design of clutch, it is very well taken care of through the strap mounting of the centrifugal levers which allows the weights to move outwardly, smoothly and without friction by the rolling contact of the levers on the straps. The connection between the levers and the spring housing by means of the struts, each presenting a knife-edge at the point of greatest articulation, likewise reduces friction to a minimum. It may be pointed out that the straps for each lever are formed of rectangular pieces of tempered spring steel, each having a thickness of .010" which has been found most satisfactory. For average loads two straps per lever has been found satisfactory, three or more may be used for heavier loads. The lever arm, at this point, is preferably formed to have a three inch radius so that when the weight moves outwardly, the straps connected to the lever—which are under a considerable tension stress due to the combined loads of the release and pressure springs—are subjected to a much higher stress because of having to bend in conformance with the three inch radius in the lever. This has been found out, after a great many laboratory tests, from which it was determined that to obtain sufficient operating life, a minimum of a three inch radius with a .010" thickness of spring steel in the strap is required, although a greater thickness can be used provided the radius is also increased. These tests also showed that fatigue life was increased considerably by having a slight initial bend or preload in the strap as indicated by the 4° in Fig. 2. This comes from the well-known fact, made use of in various designs of springs, that a greater maximum stress may be safely used if some initial stress is introduced.

In order that excessively large centrifugal weights for each of the levers 60 need not be used, the lever 60 provides a variable mechanical ratio beginning with about 3.3 to 1, with the weights retracted and dropping to about 3.00 to 1, with the weights having reached their limit of their movement by engagement with the shoulder 82 on the flywheel. This change in ratio comes with the shortening of $R_2$ as the arm rolls on the strap. The centrifugal force of a revolving body is determined from the formula $.000341WRN^2$, where W is the weight in points concentrated at the indicated center of gravity, R is the radius in feet, and N the revolutions per minute. In this clutch, as the weights move out under the influence of the speed of rotation, the total force acting on the spring housing and resisted by the springs within the housing is $$.000341 W R_3 N^2 R_2 \div R_1$$

The dimensions $R_1$, $R_2$, and $R_3$ are shown in Fig. 2 of the drawings.

It will be apparent that many changes may be made and numerous details of construction may be varied through a wide range without departing from the principles of this invention, and I, therefore, do not propose limiting the patent granted herein, unless otherwise necessitated by the prior art.

I claim:

1. In a centrifugal clutch, a pressure plate, a first member connected to and rotatable with said pressure plate and in axially spaced relation to said plate, a second member rotatable with said pressure plate and movable axially of said clutch, said first member being disposed between said second member and said pressure plate, centrifugal force-responsive elements carried by one of said members, means between said elements and the other of said members for moving the latter member in response to the forces developed centrifugally in said centrifugal elements, and spring means arranged between and engaging said other member and said pressure plate and movable toward said pressure plate, upon movement of said other member, to transfer to the pressure plate the forces said other member receives from said centrifugal elements.

2. In a centrifugal clutch, a pressure plate, spaced members rotatable with said pressure plate, one of said members being disposed between the pressure plate and the other of said members, said other member being movable axially of said clutch, centrifugal force-responsive elements carried by said one member, means between said elements and said axially movable member for moving the latter member toward the pressure plate in response to the forces developed centrifugally in said centrifugal elements, and resilient thrust means between and engaging said axially movable member and said pressure plate and positioned to impose a direct thrust to the pressure plate to transfer to the pressure plate the forces said other member receives from said centrifugal elements.

3. In a centrifugal clutch, a pressure plate movable axially from a neutral position, a member rotatable with said pressure plate, a member rotatable with said pressure plate and movable axially of said clutch, said first-mentioned member being disposed and extending between said pressure plate and said axially movable member, a centrifugal force-responsive element carried by one of said members, means between said element and the other of said members for transmitting to the latter member the forces developed centrifugally in said centrifugal element, resilient thrust means arranged between said other member and said pressure plate to transfer to the pressure plate the forces said other member receives from said centrifugal element to move said pressure plate in an axial direction from its neutral position, and other resilient means between said members for moving said pressure plate in the opposite axial direction to its neutral position.

4. In a centrifugal clutch, a pressure plate movable axially of said clutch, a member rotatable with said pressure plate and movable axially of said clutch, a member rotatable with said pressure plate and disposed between said plate and said axially movable member, centrifugal force-responsive elements carried by said second mentioned member, means between said elements and said axially movable member for transmitting to the latter member the forces developed centrifugally in said centrifugal elements, and resilient thrust means supported by said pressure plate and disposed between said axially movable member and said pressure plate to transfer to the pressure plate the forces said other member receives from said centrifugal elements.

5. In a centrifugal clutch, a pressure plate, centrifugal force-responsive means, a member rotatable with said plate and spaced from said centrifugal means, flexible means connecting said member and said centrifugal means, said flexible means providing a seat for said centrifugal means and on which seat said centrifugal means is supported for rotative movement of said centrifugal means relative to said member, said centrifugal means having rolling contact with said flexible means upon actuation of said centrifugal means by centrifugal force, and other flexible means, means disposed between and connected to said pressure plate and said centrifugal force responsive means for transmitting to said pressure plate the centrifugal force developed by said centrifugal means.

6. In a centrifugal clutch, a pair of spaced first and second members connected together for conjoint rotation and movable relative to each other, a third member engageable with said first member upon axial movement of the first member, a weighted lever connected to said first member for axially moving said first member under the influence of centrifugal force, and a resilient sheet metal member connected to the second of said spaced members and said weighted lever, said resilient member flexing and said lever having an arcuate surface adapted to roll on said resilient member upon actuation of said lever in response to centrifugal force.

7. In a centrifugal clutch, a pressure plate, a mounting plate, a spring housing, said housing and pressure plate being movable axially of said clutch and relative to each other, said mounting plate being disposed and extending between said pressure plate and said housing, a plurality of weighted levers extending through openings in said mounting plate and pivotally mounted on said mounting plate, and operatively connected to said housing for moving the same under the influence of centrifugal force, springs disposed in said housing and abutting said pressure plate, and other springs disposed between and engaging said housing and said mounting plate.

8. In a centrifugal clutch, a spring housing movable axially of said clutch, a pressure plate movable axially of said clutch and having laterally extending lugs, a mounting plate between said pressure plate and spring housing, said lugs extending through openings in said mounting plate, weighted levers pivotally mounted on said mounting plate, struts connecting said levers and said housing for axially moving said housing toward said pressure plate upon movement of said levers under the influence of centrifugal force, and springs bearing against said housing and said lugs on said pressure plate.

9. In a centrifugal clutch, a spring housing movable axially of said clutch, a pressure plate movable axially of said clutch and having laterally extending lugs, a mounting plate between said pressure plate and spring housing, said lugs extending through openings in said mounting plate, weighted levers pivotally mounted on said mounting plate, extending through openings in said mounting plate and disposed radially outward of said pressure plate, and operatively connected to said housing for axially moving the same in one axial direction, springs in said housing and operatively connected to said lugs on said pressure plate, and other springs in said housing and reacting against said mounting plate to move said housing in the opposite axial direction.

10. In a centrifugal clutch, a pressure plate, a cover plate, a weighted lever extending substantially parallel to the clutch axis and having an arm operatively connected to said pressure plate for effecting axial movement of same under the influence of centrifugal force, flexible straps connecting said lever and said cover plate, said lever having an arcuate surface thereon between its connection to said straps and the weight carried thereby and engaging said straps, means for preloading said straps to provide an initial bending thereof, movement of the centrifugally-responsive weight of said lever effecting rolling movement of said arcuate surface of said lever on said straps to move said arm of said lever for actuating said pressure plate axially of said clutch.

11. In a clutch mechanism, a pressure plate, a cover plate, means for moving said pressure plate axially of said clutch and including a lever, a plurality of superposed flexible straps connecting said lever and said cover plate, said lever and straps extending substantially parallel to the clutch axis, each of said straps being rectangular tempered spring steel members each having a minimum thickness of approximately .010" and being connected at spaced points axially of said clutch with said lever and said cover plate, said lever having a rolling contact with one of said straps.

12. A clutch mechanism as described in claim 11 wherein means are provided for preloading said straps to initially stress the same, and a weight is carried by the lever and is operative to effect movement of the lever under the influence of centrifugal force, said lever arm having an approximately 3" radius so that, when the weight on said lever moves under the influence of centrifugal force, the initial stress of said straps will be increased by the bending of said straps in conformance with said radius of said lever.

13. In a centrifugal clutch, driving members, a driven member between said driving members, one of said driving members being a flywheel having an internal peripherally extending shoulder on the side thereof facing the other driving member, said other driving member being axially movable to engage said driven member, a support rotatable with said driving members, a plurality of weighted levers pivotally mounted on said support and extending in an axial direction, the weighted ends of said levers being disposed adjacent said shouldered side of the flywheel member, stop means on the weighted ends of said levers and engageable with said shoulder to limit movement of said levers under the influence of centrifugal force, and means connecting said levers with said other driving member to move the same in an axial direction and into engagement with said driven member.

14. In a centrifugal clutch, in subcombination, a rotatable clutch member, a lever, the lever having a weighted end at the radially outer extremity of said member, and a resilient sheet metal member connected to said clutch member and said lever, said resilient member flexing and said lever having rolling contact with said resilient member upon actuation of the lever in response to centrifugal force.

15. In a centrifugal clutch, a pair of clutch members, one of said members being movable relative to the other member, a weighted lever operatively connected to said movable member for effecting movement of the same under the influence of centrifugal force, a flexible strap connecting said lever and said other member, said strap being connected to a portion of said lever spaced from the weighted portion thereof, said lever having a third portion engaging said strap, and means for preloading said strap to provide an initial bending thereof, movement of the centrifugally responsive weight of said lever effecting a rolling movement of said third portion of said lever on said strap to move said lever to actuate said movable member.

16. In a centrifugal clutch, a pressure plate, a cover plate, a weighted lever operatively connected to said pressure plate for effecting axial movement of same under the influence of centrifugal force, a flexible strap connecting said lever and said cover plate, said lever having an arcuate surface thereon spaced from its connection to said strap and the weight carried thereby and engaging said strap, and means for preloading said strap to provide an initial bending thereof, movement of the centrifugally-responsive weight of said lever effecting rolling movement of said arcuate surface of said lever on said strap to move said lever for actuating said pressure plate axially of said clutch.

17. In a clutch mechanism, a pair of first and second spaced members, one of said members being movable relative to the other of said members, means for moving said movable member and including a lever, a plurality of superposed flexible straps connecting said lever and said other member, said straps being spring steel members, each having a minimum thickness of approximately .010" and being connected at spaced points to said lever and said other member, said lever having a rolling contact with one of said straps.

18. A clutch mechanism as described in claim 17 wherein means are provided for preloading said straps to initially stress the same, and a weight is carried by the lever and is operative to effect movement of the lever under the influence of centrifugal force, said lever arm having an approximately 3" radius so that, when the weight on said lever moves under the influence of centrifugal force, the initial stress of said straps will be increased by the bending of said straps in conformance with said radius of said lever.

19. In a centrifugal clutch, a pressure plate, spaced members rotatable with said pressure plate, one of said members being disposed between the pressure plate and the other of said members, said other member being movable axially of said clutch, centrifugal force-responsive elements carried by said one member, means between said elements and said axially movable member for moving the latter member toward the pressure plate in response to the forces developed centrifugally in said centrifugal elements, and resilient thrust means between and engaging said axially movable member and said pressure plate and positioned to impose a direct thrust to the pressure plate to transfer to the pressure plate the forces said other member receives from said centrifugal elements.

REINHOLD C. ZEIDLER.

References Cited in the file of this patent

UNITED STATES PATENTS

| Number | Name | Date |
| --- | --- | --- |
| 785,126 | Springer | Mar. 21, 1905 |

(Other references on following page)

References Cited in the file of this patent

UNITED STATES PATENTS

| Number | Name | Date |
|---|---|---|
| 1,989,404 | Dickieson | Jan. 29, 1935 |
| 2,082,129 | Van Ranst | June 1, 1937 |
| 2,107,739 | Nutt et al. | Feb. 8, 1938 |
| 2,115,277 | Nutt et al. | Apr. 26, 1938 |
| 2,136,811 | Burtnett | Nov. 15, 1938 |
| 2,239,563 | Newton | Apr. 22, 1941 |
| 2,270,467 | Nutt | Jan. 20, 1942 |
| 2,405,357 | Jarrett | Aug. 6, 1946 |
| 2,406,049 | Thelander | Aug. 20, 1946 |
| 2,407,728 | Spase | Sept. 17, 1946 |
| 2,444,964 | Thelander | July 13, 1948 |
| 2,604,197 | Livermore | July 22, 1952 |

FOREIGN PATENTS

| Number | Country | Date |
|---|---|---|
| 427,649 | Great Britain | Apr. 29, 1935 |
| 496,682 | Great Britain | Dec. 5, 1938 |
| 554,006 | Great Britain | June 15, 1943 |